Nov. 13, 1923.                    1,474,049
A. W. McCURDY
AUGER OR BIT
Original Filed July 9, 1919
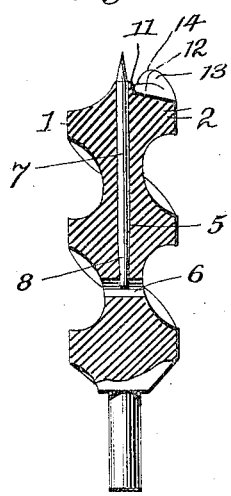
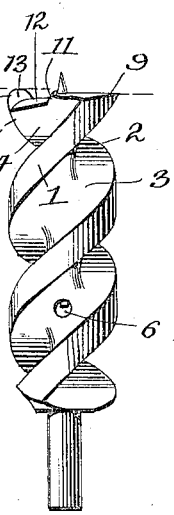
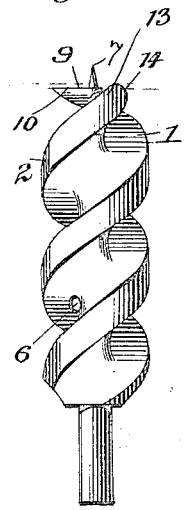
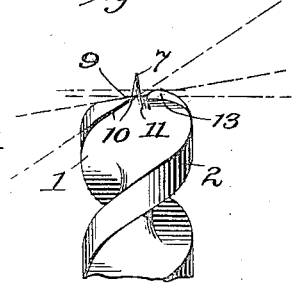
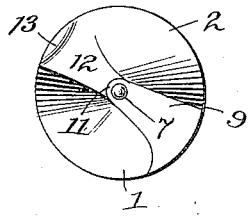
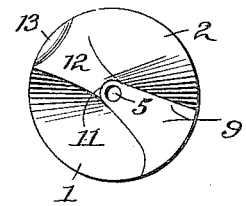
Inventor
Arthur W. McCurdy.
By Dodge and Sons,
Attorney Patented Nov. 13, 1923.

1,474,049

UNITED STATES PATENT OFFICE.

ARTHUR W. McCURDY, OF MALAHAT, BRITISH COLUMBIA, CANADA.

AUGER OR BIT.

Application filed July 9, 1919, Serial No. 309,556. Renewed June 26, 1922. Serial No. 571,113.

*To all whom it may concern:*

Be it known that I, ARTHUR W. MCCURDY, a subject of the King of Great Britain, residing at Malahat, British Columbia, Canada, have invented certain new and useful Improvements in Augers or Bits, of which the following is a specification.

This invention pertains to an improved auger or bit and has for its main object the production of an auger which may be operated at a maximum speed with a minimum expenditure of power and which will produce a smooth clean walled opening without any tendency to split the wood. This is especially important when boring near the end of a board or in cross-grained wood. A further object of the invention is to provide a structure which may be readily sharpened, and accurately centered, and to this end the auger is provided with a removable center point or punch. In addition to facilitating the sharpening and centering of the tool, the removable point, which is smooth and relatively thin, enormously reduces the head resistance of the bit and also contributes to the proper operation of the tool, as will presently appear. While the auger is adapted for general use, it is especially adapted for boring holes in laminated structures, such, for instance, as laminated wood sections now commonly employed in aeroplane work and wood as hard as lignum vitæ.

It is essential in the production of openings through such laminated structures that the holes be bored true and clean in order to produce a tight fit with the elements inserted therein, and it is also essential from an economical point of view that a plurality of such holes be bored at one and the same time in a gang press or drilling machine.

It has been found that the ordinary wood auger having the centrally disposed screw point, one or more floor lips, and one or more spur cutters, cannot be employed to bore a hole readily through a laminated wood structure, this apparently for the reason that there is inevitably produced what may be termed a button or disk immediately the first layer of wood is penetrated by the spur cutter or cutters, which disk rotates with the auger and consequently prevents further penetration of the tool. The employment of the tapering screw-threaded center point also causes the wood to crowd outwardly and to clamp or bind against the chisel or scoring cutter or cutters.

The present invention, as above noted, has for its main object the production of an auger which by reason of its novel construction does away with this difficulty and likewise has the advantage that the center point is readily removed which allows the bit as well as the point to be sharpened with facility and accuracy and the center of the bit to be always maintained.

An auger constructed in accordance with my invention is illustrated in the annexed drawings, wherein:

Fig. 1 is a vertical sectional elevation;

Fig. 2 a side elevation thereof;

Fig. 3 a like view, the auger having been given a quarter turn counter-clockwise from the position shown in Fig. 2;

Fig. 4 a side view, the auger having been given a quarter turn counter-clockwise from the position shown in Fig. 3.

Fig. 5 an end view of the auger;

Fig. 6 a similar view with the center pin removed; and

Fig. 7 an elevation of the removable point or pin.

The bit or auger is of the double twist construction wherein 1 and 2 denote the separate twists having the ordinary grooves or channels 3 and 4 between them. The body may be of the same size or diameter throughout its length or the body or twists may diminish in height slightly toward the rear of the auger if desired. The outer or cutting end of the auger is provided with a central opening 5, extending longitudinally of the body and terminating in a cross opening 6, said central opening 5 being formed for the reception of a removable centering pin or punch 7, the outer end of which is pointed and the lower end of which is slightly tapered, as at 8, and making a driving fit with the corresponding tapered lower end of the opening 5. Said pin will be thin or narrow so that the point will be smaller than the usual lead screw or point commonly employed in augers of today. The pin may be readily positioned by inserting it in the opening 5 and then tapping the outer sharpened end against a suitable block, such as vulcanite or the like, which will not dull the point, but which will drive the point inwardly so it will be held tightly to its seat in the opening. To remove the pin it is only necessary to drive a wedge or drift pin inwardly through the opening 6 beneath the lower end of the pin 7. Such wedge shaped drift pin will readily force the pin from its seat and permit the removal of the pin 7 by hand. The central opening 5 may be extended from time to time as the occasion arises by the wearing down of the bit.

The present auger is provided with a single floor lip cutter and a single chisel or scoring cutter. The floor lip cutter, designated by 9, is formed at the end of the twist 1 and extends inwardly to a point slightly beyond the center or axis of the auger. The pitch of the outer or advancing face of the floor lip cutter will preferably be formed at an angle of approximately 80° to the axis of the auger, or, stated in another way, is backed off 10° or will lie in a plane which makes an angle of 10° to a line which stands at right angles to the axis of the cutter. The inner face 10 will preferably be formed at an angle of approximately 57°. While such angular relation has been found to produce the most satisfactory results, I do not desire to be understood as limiting myself thereto as I have demonstrated that even where the advancing face of the cutter lies in a plane at 60° or is backed off 30°, highly satisfactory results obtain, and where the auger is to be employed primarily upon soft wood such angularity will be all sufficient. As will be seen upon reference to the drawings, and more particularly Figs. 2, 3, 5 and 6, the advancing face of the floor lip cutter extends beyond the center or axial line of the auger, the face being of such length transversely of the auger as to produce an extension 11 which surrounds the center pin opening 5. The outer wall of such extension inclines inwardly toward the advancing face. Such extension is produced primarily by cutting away or lowering the wall or floor of the twist 2, as at 12, intermediate said extension and the chisel or lip cutter 13 so that the floor lies in a plane in rear of or below the cutting edge of the chisel cutter. The chisel cutter is produced upon the land of the twist 2 and as will be seen upon reference to the drawings, it is shallow and lies in a plane which is only slightly, say $\frac{1}{32}$ of an inch, in advance of the cutting edge of the floor lip or chisel cutter. Said chisel cutter differs from the usual chisel cutter in that it is no higher than the land of the twist from which it is produced and is not formed as an outward projection thereof, a point of manifest advantage in that the auger may be continually resharpened both as to the floor lip cutter and the chisel cutter until the body of the bit becomes too short to be further useful. The forward or advancing end of the chisel cutter is preferably rounded, as at 14. Inasmuch as said cutter is not high it is substantial in construction, and not readily injured; consequently, it will not bend when it strikes a knot, nor will it be deflected when the auger is being employed in cross grained wood. Again, owing to its slight elevation in advance of the floor lip cutter it is next to impossible to cut out a washer upon one complete revolution of the auger, which, through its rotation with the auger would impede the cutting action of the floor lip.

In operation it is found that the auger will readily enter the wood and produce a true smooth walled hole and this even in cross grain or end-on grain wood. Owing to the very slight head resistance the power required to operate the bit is small as compared to that necessary to operate the usual auger, and this is readily demonstrated by the fact that the auger without the use of a bit stock or any wrench or holder may be turned by hand into a piece of wood, whereas the ordinary auger can not be so operated; in fact, it may be made to bore where other augers, particularly those having a feeding screw, can scarcely be made use of at all under like conditions. This facility of feeding is, of course, of particular advantage in the use of the auger and especially so when used in gang. The structural formation of the bit or auger is such that it enters the wood easily and it is not necessary to provide it with a threaded point to draw it in as is the case with the ordinary bit. The pin 7 is so fine that it is not liable to split the wood when entering it and this, of course, is of advantage when boring thin pieces or near the end of a board or in cross grained wood. It bores so easily that at a high speed of rotation it does not readily become heated. By the employment of the small center pin in place of the ordinary center or lead screw the wood is not crowded outwardly and does not, therefore, become jammed or caught between the point and the chisel or scoring cutter 12, and this substantially contributes to its ease of operation.

By removing the center pin the floor lip cutter as well as the chisel cutter may be readily sharpened and the point upon the center pin reformed and the pin shortened to bring it to the proper length relative to the two cutters, and the true center of the auger be always maintained.

It will be appreciated that the auger constructed as above set forth may be readily sharpened and such sharpening may be continued throughout the length of that portion of the body which is of sufficient diameter to produce the requisite sized hole, whereas in the case of the cylindrical form it may be continued through its entire length. This is primarily due to the fact that the scoring or chisel cutter 12 is no wider than the land of the twist upon which it is formed.

While I have set forth the use of the auger in connection with laminated stock, it is equally as useful in boring cross grain or grain-on stock or very hard wood such as lignum vitæ, the chips feeding out without choking the tool, the hole formed being clear and smooth. In fact the clearance is such that it does away with the necessity of drawing the bit or auger out from time to time to remove the borings or chips as is frequently necessary with the common auger of today.

While I have shown the center pin as having a smooth round pointed outer end it is conceivable that the method of mounting the pin may be employed with a pin the outer end whereof is threaded, or, in other words, fashioned into the usual lead screw where for any reason such lead screw is found desirable, or fashioned in any other shape whatsoever. The formation of the opening 5 in the outer portion of the auger requires only a minimum of labor and expense and at the same time removes but little of the stock of the auger, thereby preventing weakening of the body as a whole. Moreover by providing the extension 11, which may be said to be frusto-conical in form, the breaking down of the body around the opening 5 is eliminated. The hole may be extended from time to time as the bit wears away. Such formation is of manifest advantage over those augers and bits wherein the hole extends from end to end of the bit with the pin coextensive thereof, as some special fastening means has to be employed for securing or holding the pin therein. It is especially advantageous in bits of extreme length.

What is claimed is,—

1. An auger or bit having two spirals; a plain center point; a floor lip cutter formed at the end of one of the spirals; and a scoring cutter formed of the edge of the other spiral and of a height no greater than the land of the spiral, with the floor of the groove which leads to said cutter removed or cut away so that it terminates in a plane in rear of the cutting edge of the floor lip cutter.

2. An auger or bit having two spirals; a smooth center point of relatively small diameter; a floor lip cutter formed at the end of one of the spirals, said cutter having a straight cutting edge extending from a point in substantial coincidence with the axis of the auger, the outer face of the cutter being at an angle approximately of 80° with the axis of the bit and the inner face of the adjacent spiral groove at an angle approximately of 57° with the axis of the bit, and a scoring cutter formed on the edge of the other spiral, the wall of the groove adjacent said scoring cutter being removed so that its edge lies in a plane in rear of the cutting edge of the floor lip cutter.

3. An auger or bit having two spirals; a plain center point; a floor lip cutter formed at the outer end of one of the spirals, the advancing face whereof is backed off to an angle of approximately 10°; and a chisel cutter formed at the outer margin of the other spiral, said chisel cutter being of a height no greater than the land of the spiral upon which it is formed and extending outwardly to a slight extent only beyond the cutting edge of the floor lip cutter, the floor of the spiral intermediate said chisel cutter and the center point being lowered or cut away.

4. An auger or bit having two spirals; a floor lip cutter formed at the outer end of one of said spirals, the advancing face whereof extends laterally to a point slightly beyond the axis of the auger, with the floor of the other spiral lowered to a plane below that of the cutting edge of the floor lip cutter, the face of such lowered floor adjacent the axis of the auger curving upwardly and forming a frusto-conical shaped surface to which the floor lip edge is tangent; a center point; and a chisel cutter formed from the land of the other spiral.

5. An auger or bit having two spirals; a floor lip cutter formed at the outer end of one of said spirals, the advancing face whereof is backed off to approximately 10°, said face projecting laterally beyond the axis of the auger with the floor of the other spiral lowered to a plane below that of the cutting edge of the floor lip cutter and merging at its inner portion by an upwardly extending and inclined wall into the advancing face of the floor lip cutter, the auger having an axially extending bore formed in the extended face of said cutter; a center pin mounted in said bore; and a chisel cutter formed from the land of the second spiral by the lowering of the floor of said spiral.

6. An auger or bit having two spirals; a center point; a floor lip cutter formed at the outer end of one of the spirals, the advancing face whereof is backed off to an angle of approximately 10° with the inner face standing at an angle of approximately 57° to the vertical; a chisel cutter formed at the outer margin of the other spiral and extending outwardly to a slight extent only beyond the cutting edge of the floor lip cutter, the floor of the spiral intermediate said chisel cutter and the center point being lowered or cut away.

7. An auger or bit having two spirals; a center point; a floor lip cutter formed at the lower end of one of the spirals and substantially coextensive thereof; and a chisel cutter formed on the other spiral as a direct continuation thereof only, as to its axial or vertical dimension, said chisel cutter having its cutting edge lying in a plane substantially parallel to the axis of the auger with the floor of the groove which leads to said cutter removed or cut away so that it terminates in a plane in rear of the cutting edge of the lip cutter.

8. An auger or bit having two spirals; a smooth center point of relatively small diameter; a floor lip cutter formed at the lower end of one of the spirals, said cutter having a straight cutting edge extending from a point in substantial coincidence with the axis of the auger to the outer face of the spiral, the under face of the lip adjacent the cutting edge being relatively flat as compared to the pitch of the spiral, while the upper face merges gradually into the wall of the spiral recess adjacent thereto; and a chisel or scoring cutter formed upon the lower end of the other spiral, the cutting edge whereof extends not more than the lift of the lifting lip during substantially a half revolution of the auger below the plane of the cutting edge of the floor lip cutter, the wall of the groove adjacent said chisel cutter being removed so that its edge lies in a plane in rear of that of the cutting edge of the floor lip cutter.

9. An auger having two spirals; a center point; a floor lip cutter formed upon the lower end of one spiral; and a chisel cutter formed as a continuation of the land of the other spiral and having the same external curvature as said land, said cutter being sharpened on its forward end and on its lower edge, and being of a width substantially the same as that of the land of which it is a continuation, and projecting below the edge of the floor lip cutter not more than the lift of the lifting lip during substantially a half revolution.

10. A bit or boring tool comprising a body in the form of a flat bar twisted to produce a double spiral and having at its fore end a smooth axial centering point, one of said spirals terminating in a chisel cutting lip substantially perpendicular to the axis of the tool, and the other spiral terminating in a cutting lip formed by and of the width and curvature of the outer edge of said spiral, the web or floor portion of said spiral between said lip and the central portion of the bit being cut away to a point in rear of the chisel lip of the companion spiral.

11. An auger of the double twist type having a floor lip cutter, a scoring cutter, and a removable center point seated within and frictionally held by contact with the walls of an opening formed in the outer end of the auger.

12. An auger of the double twist or spiral type having an opening formed axially therein at its outer end and opening into a transverse opening formed in the auger body, and a center point of small diameter seated and frictionally held in the axially disposed opening and having its inner end extending into the transverse opening.

13. An auger of the double twist or spiral type having an opening formed axially therein at its outer end and terminating in a transverse opening formed in the auger body, and a smooth pointed center pin seated in the axially disposed opening with its lower end projecting into the transverse opening.

14. An auger of the double twist or spiral type having an axially disposed opening formed in its outer end, the inner portion of said opening being inwardly tapered and opening into a transverse opening formed in the auger body, and a pin having its inner end tapered and adapted to seat upon the tapered portion of the axial opening, said pin projecting into the transverse opening and being frictionally held by contact with the wall of said axially disposed opening.

In testimony whereof I have signed my name to this specification.

ARTHUR W. McCURDY.